US012651749B1

(12) United States Patent
Liu et al.

(10) Patent No.:  US 12,651,749 B1
(45) Date of Patent:       Jun. 9, 2026

(54) SPHERICAL ELECTROCHEMICALLY ACTIVE-MATERIAL STRUCTURES COMPRISING HIGH-CAPACITY MATERIALS AND BATTERY ELECTRODES COMPRISING THEREOF

(71) Applicant: Clyra Inc., Dover, DE (US)

(72) Inventors: Xiaohua Liu, Mountain View, CA (US); Sa Zhou, Fremont, CA (US); Song Han, Foster City, CA (US)

(73) Assignee: Clyra Inc., Dover, DE (US)

( * ) Notice:    Subject to any disclaimer, the term of this patent is extended or adjusted under 35 U.S.C. 154(b) by 881 days.

(21) Appl. No.: 17/663,559

(22) Filed:    May 16, 2022

(51) Int. Cl.
| | |
|---|---|
| *H01M 4/62* | (2006.01) |
| *H01M 4/134* | (2010.01) |
| *H01M 4/38* | (2006.01) |
| *H01M 10/0525* | (2010.01) |
| *H01M 4/02* | (2006.01) |

(52) U.S. Cl.
CPC ............. *H01M 4/62* (2013.01); *H01M 4/134* (2013.01); *H01M 4/386* (2013.01); *H01M 10/0525* (2013.01); *H01M 2004/021* (2013.01); *H01M 2004/027* (2013.01)

(58) Field of Classification Search
CPC ........ H01M 4/62; H01M 4/134; H01M 4/386; H01M 10/0525; H01M 2004/021; H01M 2004/027
See application file for complete search history.

(56)                References Cited

U.S. PATENT DOCUMENTS

| | | |
|---|---|---|
| 8,962,183 B2 | 2/2015 | Rayner |
| 11,223,036 B2 | 1/2022 | Liu et al. |
| 2017/0346079 A1* | 11/2017 | Friend ................... H01M 4/587 |

(Continued)

OTHER PUBLICATIONS

Khim Karki, Eric Epstein, Jeong-Hyun Cho, Zheng Jia, Teng Li, S. Tom Picraux, Chunsheng Wang and John Cumings. Lithium-assisted electrochemical welding in silicon nanowire electrodes. Nano Letters, 12 (3): 1392-1397. 13 pages.

(Continued)

*Primary Examiner* — Lingwen R Zeng
(74) *Attorney, Agent, or Firm* — Polygon IP, LLP

(57)                ABSTRACT

Described herein are electrochemically active-material structures comprising high-capacity materials. The mean largest cross-sectional dimension of these structures is kept below the pulverization threshold, which corresponds to the structures' composition. As such, the structure fracturing during battery cycling is reduced thereby preserving the battery capacity. Furthermore, these structures have a sphericity of at least about 0.9. Such high sphericity values translate into a small surface area for a given volume thereby reducing the electrolyte decomposition and solid electrolyte interphase (SEI) formation on the surface of these structures. Furthermore, the small size and high sphericity help to keep swelling substantially isotropic nature. The small structure size also helps with preserving the initially formed SEI layer thereby limiting this SEI formation to initial cycles. Finally, the initial distribution, layer porosity, small size, and sphericity help to reduce the coalescence of these structures during cycling, e.g., typically caused by Li-assisted electrochemical welding.

19 Claims, 6 Drawing Sheets

(56) References Cited

U.S. PATENT DOCUMENTS

2018/0269475 A1     9/2018  Oh et al.
2022/0344660 A1 *  10/2022  Kim .................... H01M 4/0404

OTHER PUBLICATIONS

McDowell et al., "In Situ TEM of Two-Phase Lithiation of Amorphous Silicon Nanospheres" dx.doi.org/10.1021/nl3044508 | Nano Lett. 2013, 13, 758-764. 7 pages.
Wang et al., "Size effect on the growth and pulverization behavior of Si nanodomains in SiO anode"—Nano Energy vol. 78, Dec. 2020, 105101. 25 pages.
Xiao Hua Liu, Li Zhong, Shan Huang, Scott X. Mao, Ting Zhu and Jian Yu Huang. Size-dependent fracture of silicon nanoparticles during lithiation. ACS Nano, 6 (2) 1522-1531 (2012), 13 pages.

* cited by examiner

| Negative Electrode 100 |
|---|
| Negative Active Material Layer 102 |
| Electrochemically active-material structures  110 |
| High-capacity material 112 |
| Additional material 114 |
| Additional structures 120 |
| Conductive-additive structures 122 |
| Stabilizing Structure  124 |
| Binder 126 |
| Pores 130 |
| Current Collector 104 |

SPHERICAL ELECTROCHEMICALLY ACTIVE-MATERIAL STRUCTURES COMPRISING HIGH-CAPACITY MATERIALS AND BATTERY ELECTRODES COMPRISING THEREOF

BACKGROUND

High-capacity materials, such as silicon, are very desirable for various battery applications because of their high gravimetric and volumetric capacities. However, many high-capacity materials undergo significant volume changes during charge-discharge cycling (e.g., incorporation-removal of lithium ions). The repeated cycling and corresponding volume changes can cause pulverization of these materials and/or loss of electrical connections between these materials and other electrode components. Conventional integration of high-capacity materials into electrodes typically results in high irreversible capacity losses, excessive solid electrolyte interphase (SEI) formation, and losses of electrical contacts within electrodes formed from these materials, all of which are highly undesirable. These issues have limited the application of high-capacity active materials in batteries.

Different solutions have been proposed to address these high-capacity material integration issues. One example involves using silicon nanostructures with controlled porosity to buffer the volume expansion. Another example uses composites with a conductive matrix including various carbon structures. Yet another example relies on nano-silicon domains dispersed in bulky silicate matrices (e.g., $MgSiO_3$, $Li_2SiO_3$). However, all of the solutions have various drawbacks such as the low packing density of porous materials, the high production cost of depositing silicon onto the carbon structures using gas-phase reactions, and the instability caused by aggregation and pulverization of silicon nanodomains inside silicate matrices.

What is needed are electrochemically active-material structures comprising high-capacity materials capable of withstanding repeated charge-discharge cycling while maintaining the integrity and performance of the electrodes.

SUMMARY

Described herein are electrochemically active-material structures comprising high-capacity materials. The mean largest cross-sectional dimension of these structures is kept below the pulverization threshold, which corresponds to the structures' composition. As such, the structure fracturing during battery cycling is reduced thereby preserving the battery capacity. Furthermore, these structures have a sphericity of at least about 0.9. Such high sphericity values translate into a small surface area for a given volume thereby reducing the electrolyte decomposition and solid electrolyte interphase (SEI) formation on the surface of these structures. Furthermore, the small size and high sphericity help to keep swelling substantially isotropic nature. The small structure size also helps with preserving the initially formed SEI layer thereby limiting this SEI formation to initial cycles. Finally, the initial distribution, layer porosity, small size, and sphericity help to reduce the coalescence of these structures during cycling, e.g., typically caused by Li-assisted electrochemical welding.

In some examples, a negative battery electrode for use in a lithium-ion electrochemical cell comprises electrochemically active-material structures comprising a high-capacity material. The electrochemically active-material structures have a mean largest cross-sectional dimension (LCD) below a pulverization threshold (PT) (LCD<PT), corresponding to the composition of the electrochemically active-material structures. Furthermore, the electrochemically active-material structures have sphericity (S) of at least about 0.9 or, more specifically, at least about 0.95.

In some examples, the mean largest cross-sectional dimension is within 50% of the pulverization threshold. In the same or other examples, the electrochemically active-material structures have a dimension ratio (DR) defined as the mean largest cross-sectional dimension divided by the pulverization threshold (DR=LCD/PT). A primary ratio (PR), which is defined as the dimension ratio divided by the sphericity (PR=DR/S), is less than 0.9 or, more specifically, less than 0.8. In some examples, the primary ratio (PR) is selected based on an expected depth of charge of the high-capacity material.

In some examples, the electrochemically active-material structures are predominantly disjoint structures with a disjoint ratio of at least 90%. In the same or other examples, the electrochemically active-material structures are uniformly distributed within the negative battery electrode.

In some examples, the negative battery electrode further comprises additional structures that are configured to experience substantially no volume change during the cycling of the lithium-ion electrochemical cell. The relative positions of the electrochemically active-material structures and the additional structures remain the same during the cycling of the lithium-ion electrochemical cell.

In some examples, the additional structures are selected from the group consisting of conductive-additive structures, stabilizing structures, and binder. For example, the additional structures are the conductive-additive structures formed from a material selected from the group consisting of graphite, acetylene black, metal silicides, metal oxides, and silicates. In specific examples, the additional structures comprise one or more graphite and lithium titanate ($Li_4Ti_5O_{12}$).

In some examples, the additional structures contribute at least 20% of the total lithiation capacity of the negative battery electrode. For example, the additional structures comprise graphite, while the electrochemically active-material structures comprise silicon. In this example, the weight ratio of the additional structures to the electrochemically active-material structures is one of (a) less than 5, (c) greater than 1, (d) greater than 10, or (e) greater than 90.

In another example, the high-capacity material is silicon. The high-capacity material represents at least 90% atomic of the electrochemically active-material structures. The pulverization threshold is 1 micrometer.

In yet another example, the high-capacity material is silicon. The high-capacity material represents less than 30% atomic of the electrochemically active-material structures. The pulverization threshold is 20 micrometers.

In some examples, the electrochemically active-material structures further comprise an additional material, besides the high-capacity material. The additional material is selected from the group consisting of magnesium, lithium, calcium, aluminum, copper, nickel, and iron.

In some examples, the electrochemically active-material structures form, at least in part, a negative active material layer. The negative active material layer has a specific porosity defined as a ratio of a volume of all void spaces in the negative active material to a volume of the electrochemically active-material structures ($SP=V_{VOIDS}/V_{EAMS}$). The specific porosity (SP) of the negative active material layer is at least 200% or, more specifically, at least 300%.

Also provided are electrochemically active-material structures for use in a negative battery electrode of a lithium-ion electrochemical cell. The electrochemically active-material structures comprise a high-capacity material. The electrochemically active-material structures have a mean largest cross-sectional dimension below a pulverization threshold, set by the composition of the high-capacity material. The electrochemically active-material structures have a sphericity of at least about 0.9.

BRIEF DESCRIPTION OF THE DRAWINGS

FIGS. 1A and 1B are schematic reproductions of the transmission electron microscope (TEM) images illustrating a 1.8-micron silicon structure disintegrated due to the lithiation (to a full lithiation capacity), in accordance with some examples.

DETAILED DESCRIPTION

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

As noted above, high-capacity active materials tend to experience significant volume changes during lithiation (increase in volume/swelling) and delithiation (decrease in volume). At large scales and if not controlled, these volume changes can pulverize active-material structures and disrupt electronic pathways within the electrode layers. For example, FIGS. 1A and 1B are schematic reproductions of the TEM images illustrating a 1.8-micron silicon structure disintegrated due to the lithiation to a full (100%) lithiation capacity, which is about 3579 mAh/g at the room temperature. During such lithiation, the silicon structure experiences a volume increase in the volume of about 3.81 times. However, this volume increase is not uniform and causes various internal stresses, which cause the structure to crack and, more generally, to pulverize. These cracks break electronic and ionic connections and expose additional surfaces for SEI formation, all of which are highly undesirable and result in capacity losses.

Figure 1C:
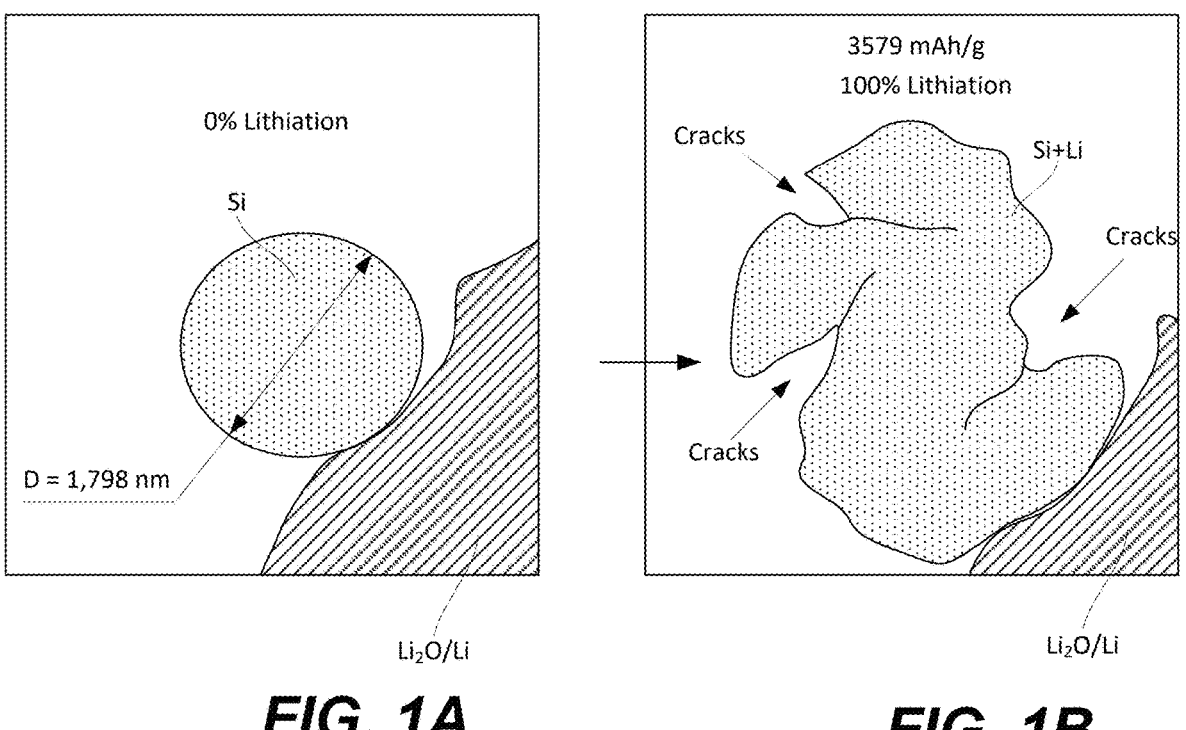
FIG. 1C is another schematic representation of an electrochemically active-material structure comprising a high-capacity material, such as silicon, illustrating the anisotropic nature of lithium diffusion into the structure and swelling of the structure, in accordance with some examples.
Figure 1C:
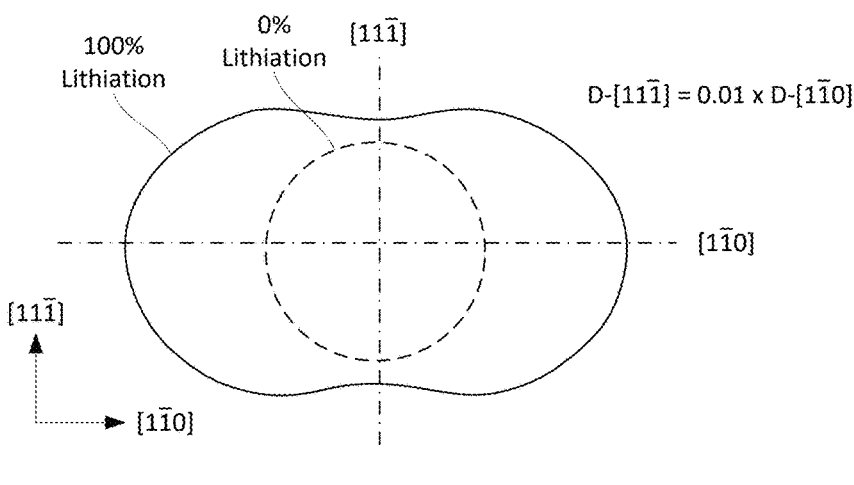

Another factor, which is related to the pulverization of high-capacity materials, is anisotropic swelling. FIG. 1C is a schematic representation of an electrochemically active-material structure comprising a high-capacity material before lithiation (dashed line) and after lithiation (solid line) lithiation. It should be noted that the swelling is attributable to high-capacity materials (vs. low-capacity materials). For purposes of this disclosure, the term "high-capacity material" is defined as a material with a theoretical lithiation capacity of at least 800 mAh/g. Furthermore, it should be noted that the swelling mechanism differs for different sizes of electrochemically active-material structures. The example in FIG. 1C is attributed to an electrochemically active-material structure having a mean largest cross-sectional dimension (LCD) that is above the pulverization threshold for a specific high-capacity material forming this structure. Pulverization thresholds are further described below with reference to specific materials.

As shown in FIG. 1C, the structure expands unevenly (anisotropically swells) along different axes due to the difference in lithium diffusions along different crystallographic axes. This diffusion difference is a result of specific morphological properties of the material forming this structure. For example, silicon has about 100 times faster diffusion along the [110] crystallographic axis than along the [111] axis. As a result, a spherical silicon structure (shown with a dashed line) swells into an oval-like shape (shown with a solid line) during lithiation. This anisotropic swelling can cause pulverization. In general, it is desirable that swelling is uniform in all directions (isotropic swelling) so that the deformation is even (e.g., sphere-to-sphere). It has been found that maintaining the size of electrochemically active-material structures below the pulverization threshold can help to maintain isotropic swelling.

Described herein are electrochemically active-material structures comprising high-capacity materials that overcome the above-referenced problems by maintaining a specific size and sphericity as well as being sufficiently dispersed to prevent these structures from fusing/coalescing during cell cycling. For example, the mean largest cross-sectional dimension of these structures is kept below the pulverization threshold corresponding to the composition (e.g., less than 1 micrometer for electrochemically active-material structures formed essentially from silicon). It should be noted that the mean largest cross-sectional dimension is within a set range such that excessively small particles are not desirable because of their high surface area (for a given volume). As noted above, keeping the size below the pulverization threshold helps to reduce the fracturing of the active-material structures during cycling as well as to maintain any swelling within the isotropic regime. Despite the small particle sizes, the surface area of these particles is kept to a minimum due to the high sphericity of these particles, e.g., at least about 0.9 or even at least about 0.95. Finally, the distribution of these particles within the active material layer, the porosity of this layer, as well as the small structure sizes and sphericity help to reduce the coalescence of these structures during cycling (e.g., typically caused by lithium-assisted electrochemical welding).

Figures 2A, 2B:
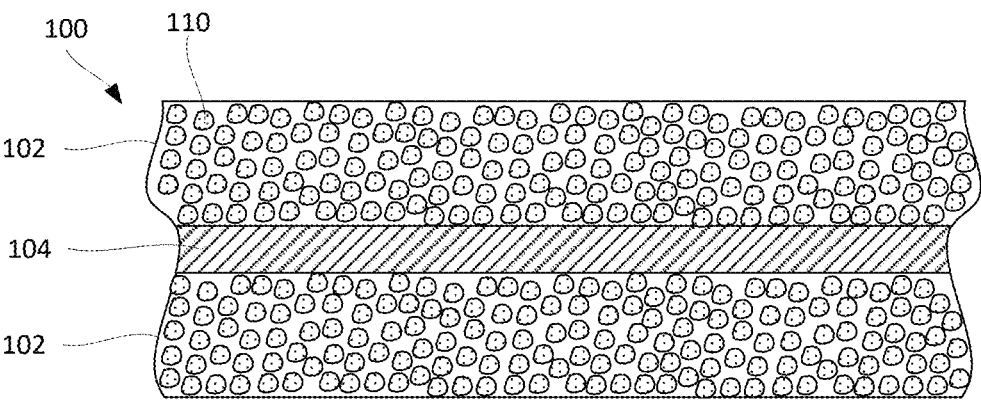
FIG. 2A is a schematic cross-sectional view of a negative electrode comprising electrochemically active-material structures, in accordance with some examples.
FIG. 2B is a block diagram illustrating various components of the negative electrode of FIG. 2A, in accordance with some examples.

Examples of Negative Electrodes and Electrochemically Active-Material Structures FIG. 2A is a schematic illustration of negative battery electrode 100, in accordance with some examples. FIG. 2B is a corresponding block diagram illustrating various components of negative battery electrode 100 that may be difficult to represent graphically. Specifically, negative battery electrode 100 comprises current collector 104 and one or two negative active material layers 102, supported by current collector 104. Current collector 104 provides electric communication between negative active material layers 102 and other components of a lithium-ion electrochemical cell that this negative battery electrode 100 is a part of. While FIG. 2A illustrates two negative active material layers 102, one having ordinary skill in the art would understand that an example with one negative active material layer 102 is also within the scope. This example may be referred to as a one-sided negative battery electrode. Various examples of current collector 104 are within the scope, such as copper and/or copper dendrite coated metal oxides, stainless steel, titanium, aluminum, nickel, chromium, tungsten, metal nitrides, metal carbides, carbon, carbon fiber, graphite, graphene, carbon mesh, conductive polymers, or combinations of above including multi-layer and/or composite structures. Current collector 101 may be formed as a foil, films, mesh, metallic foam laminate, wires, tubes, particles, multi-layer structure, or any other suitable configurations. In one example, current collector 104 is a stainless steel foil having a thickness of between about 1 micrometer and 50 micrometers. In other examples, current collector 104 is a copper foil with a thickness of between about 5 micrometers and 30 micrometers. In yet another example, current collector 130 is an aluminum foil with a thickness of between about 5 micrometers and 50 micrometers. It should be noted that the material of current collector 104 used in negative battery electrode 100 should be stable for potential ranges experienced by negative battery electrode 100.

Each negative active material layer 102 comprises electrochemically active-material structures 110. In some examples, negative active material layer 102 comprises additional structures 120 such as conductive-additive structures 122, stabilizing structures 124, and/or binder 126. Negative active material layer 102 can also comprise pores 130, which can be used to accommodate the swelling of electrochemically active-material structures 110 during their lithiation. The porosity of negative active material layer 102 is further described below. It should be noted that further description of various components of negative active material layer 102 is presented at 0% lithiation state or, more specifically, in an as-fabricated state (e.g., before the SEI layer formation and any initial lithiation) unless noted otherwise.

Electrochemically active-material structures 110 comprise high-capacity material 112. The definition of high-capacity materials is presented above to differentiate these materials from low-capacity materials that are not prone to swell. It should be noted that low-capacity materials can be also parts of electrochemically active-material structures 110 (e.g., as additional materials) and/or in additional structures 120 (e.g., in conductive-additive structures 122 and/or stabilizing structures 124). Some examples of high-capacity material 112 include, but are not limited to, silicon, silicon oxide, tin, tin oxides, germanium, and silicide. For example, silicon has a theoretical lithiation capacity of 3,579 mA/g and swells to about 3.8 times its initial volume at this lithiation limit. Germanium has a theoretical lithiation capacity of 1600 mA/g and swells about 3.5 times. Tin has a theoretical lithiation capacity of 994 mA/g and swells about 2.6 times. As a reference, graphite has a theoretical lithiation capacity of 372 mA/g and is an example of low-capacity materials. As noted above, as a result of these large capacities, high-capacity materials tend to experience large volume changes.

In some examples, high-capacity material 112 represents at least about 1% by weight of electrochemically active-material structures 110 or, more specifically, at least about 2%, at least about 5%, at least about 10%, at least about 20%, at least about 50%, at least about 80%, at least about 90%, at least about 95%, at least about 99% or even at least about 99.9% (e.g., in solid-state battery cells under pressure with little to no binder). In general, any amounts of high-capacity material 112 in electrochemically active-material structures 110 are within the scope. It should be noted that having more high-capacity material 112 in electrochemically active-material structures 110 increases the lithiation capacity of electrochemically active-material structures 110. However, such electrochemically active-material structures 110 are also more prone to pulverization and additional precautions should be taken into account in the form of small structure sizes and sphericity as further described below. The rest of electrochemically active-material structures 110 can be additional material 114, such as low-capacity materials.

Figure 3A:
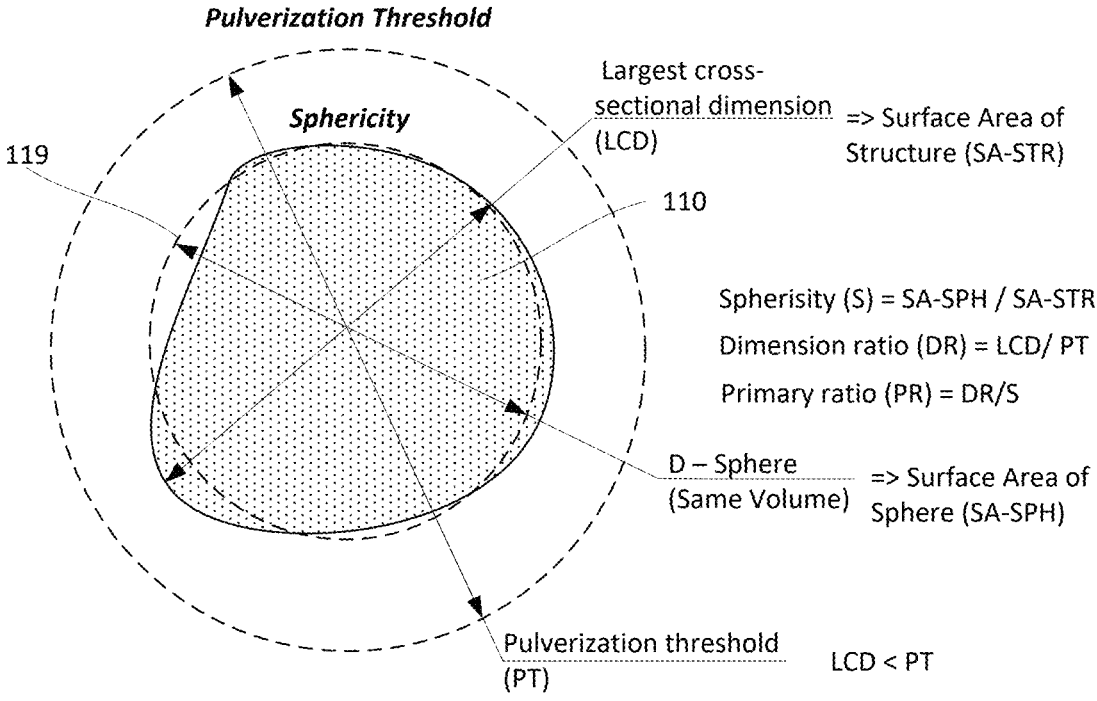
FIG. 3A is a schematic illustration of one electrochemically active-material structure in the negative electrode of FIG. 2A, which presents the pulverization threshold and sphericity concepts, in accordance with some examples.
Figure 3B:
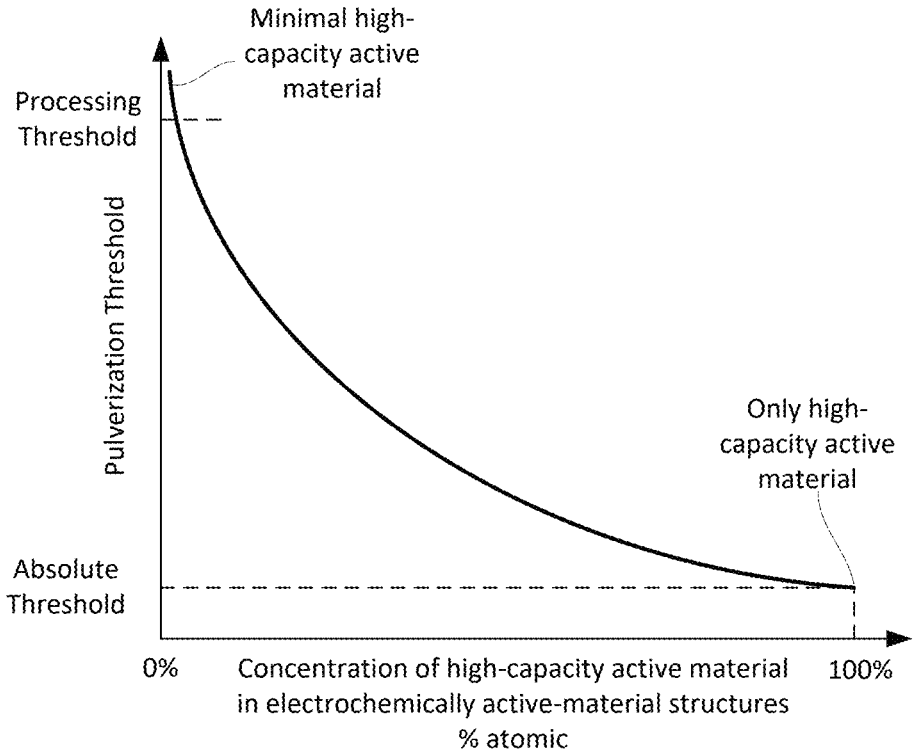
FIG. 3B is a plot of the pulverization threshold as a function of the concentration of high-capacity materials in electrochemically active-material structures, in accordance with some examples.
Figures 4A, 4B, 4C, 4D:
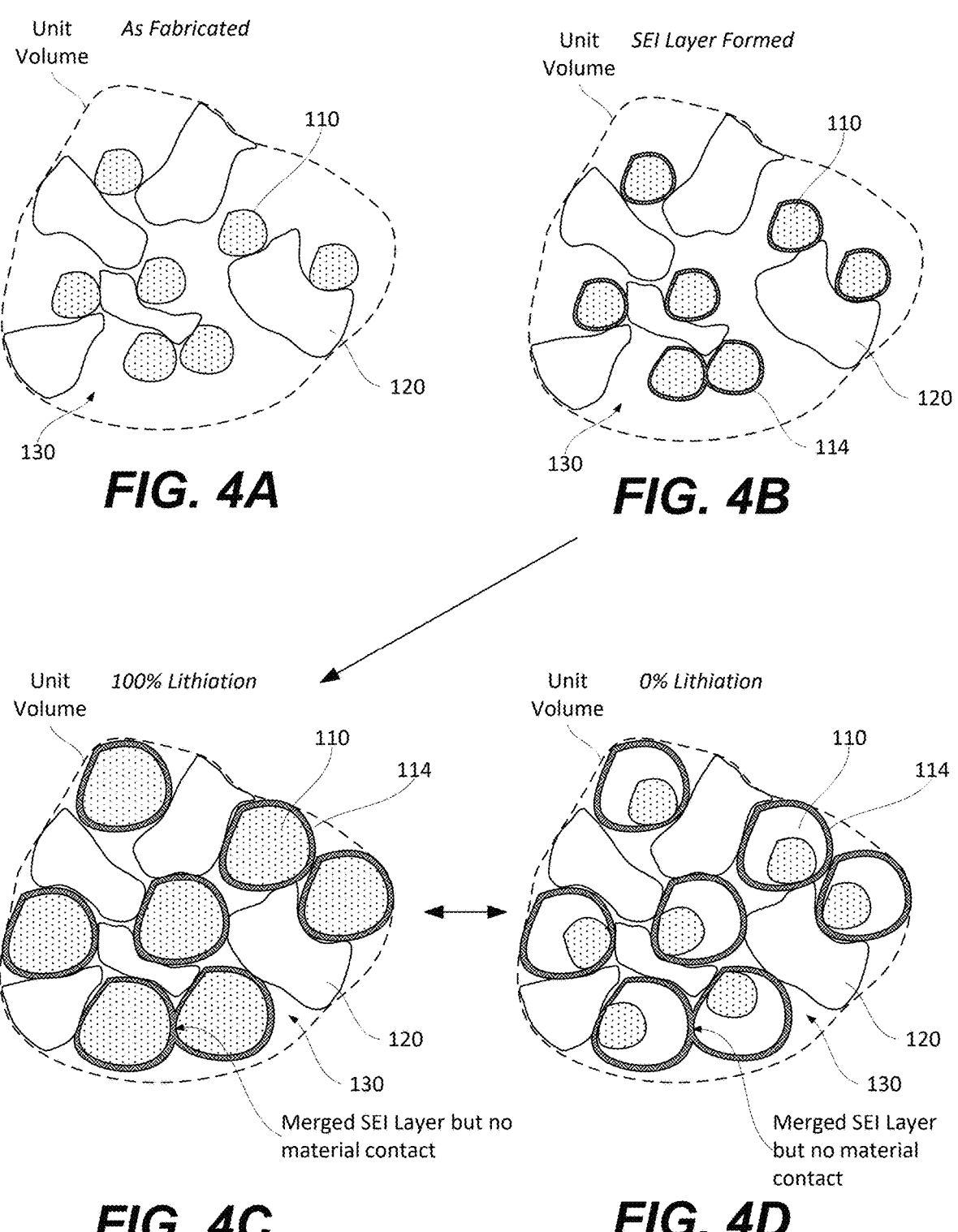
FIGS. 4A-4D are schematic illustrations of one cluster (unit volume) of electrochemically active-material structures in the negative electrode of FIG. 2A during various stages of fabrication and operation of the negative electrode, in accordance with some examples.

The pulverization of electrochemically active-material structures 110 is reduced or generally avoided since electrochemically active-material structures 110 have a mean largest cross-sectional dimension below a pulverization threshold, corresponding to the composition of the electrochemically active-material structures 110. For purposes of this disclosure, the pulverization threshold is defined as the maximum size of the electrochemically active-material structures (based on the largest cross-sectional dimension) at which these structures can be lithiated to the maximum capacity without causing any breakage of these structures. The pulverization threshold depends, at least in part, on the composition of electrochemically active-material structures (i.e., defining the extent of swelling), the directions of lithium diffusion influx (i.e., defining the swelling isotropy), and the lithiation speed relative to the deformation speed of the lithiated phases to accommodate the lithiation-induced swelling (i.e., defining the probability of occurrence of localized, an uneven strain that could lead to crack propagation or fracture), and/or crystallinity (i.e., amorphous versus crystalline structures that could impact both lithium diffusivity and kinetics). The pulverization threshold is schematically shown in FIG. 3A with a dashed line. It should be noted that the pulverization threshold is inverse proportional to the concentration of high-capacity material 112 in electrochemically active-material structures 110 as, e.g., is schematically shown in FIG. 3B. For example, the pulverization threshold for electrochemically active-material structures 110 made essentially of silicon (e.g., >90% by weight) is 1 micrometer. On the other hand, when silicon represents less than 30% by weight of electrochemically active-material structures 110 (while the rest is lithium and/or magnesium), the pulverization threshold increases to 20 micrometers. In other words, in some examples, high-capacity material 112 is silicon. High-capacity material 112 represents at least 90% atomic of electrochemically active-material structures 110. In these examples, the pulverization threshold is 1 micrometer. Alternatively, high-capacity material 112 represents less than 30% atomic of electrochemically active-material structures 110. In these examples, the pulverization threshold is 20 micrometers. It should be noted that the mean largest cross-sectional dimension (LCD) also has a processing threshold determined by various processing parameters, including the thickness of negative active material layer 102. In another example, amorphous silicon particles with sizes up to 870 nm do not fracture upon the full lithiation. In yet another example, amorphous silicon pillars (with an underlying nickel pillar that provides additional constraints show non-fracture swelling up to 2.3 micrometers in diameter).

One challenge with using such small electrochemically active-material structures is the much larger surface areas of these structures. By way of an example, a sphere has a ratio of the surface area ($4\pi r^2$) to the volume ($4/3\pi r^3$) of $3/r$. As such, the surface area increases inverse proportionally to the particle size (for a given amount of the material) for active material structures having sphere-like shapes. Additional surface area is not desirable as it causes the excessive formation of solid electrolyte interphase (SEI), which traps lithium and has other negative effects. While SEI formation is unavoidable, it should be kept to a minimum.

One mitigation aspect is for the mean largest cross-sectional dimension (LCD) to be sufficiently close to the pulverization threshold (PT) while still being less than the pulverization threshold (LCD<PT). In some examples, the mean largest cross-sectional dimension is within 50% of the pulverization threshold or, more specifically, within 70% or even within 90%. Another mitigation aspect is the same of electrochemically active-material structures 110. For example, a spherical shape has the lowest surface-area-to-volume ratio ($3/r$) among all 3D shapes. Therefore, electrochemically active-material structures 110 with high sphericity values can be used to mitigate the SEI formation issue.

In some examples, electrochemically active-material structures 110 have a sphericity of at least about 0.9 or, more specifically, at least about 0.95 or even at least about 0.97. For purposes of this disclosure, the sphericity (S) of an electrochemically active-material structure is defined as a ratio of the surface area of a sphere (SA-SPH) with the same volume as this structure to the surface area of the structure (SA-STR), or S=SA-SPH/SA-STR as, e.g., is schematically shown in FIG. 3A. For example, the sphericity of a cube is about 0.806, while the sphericity of a dodecahedron (i.e., a polyhedron with twelve flat faces) is about 0.910.

It should be noted that the closer the largest cross-sectional dimension to the pulverization threshold, the higher sphericity is needed. This joined characteristic can be expressed as a primary ratio (PR). First, a dimension ratio (DR) is defined as the mean largest cross-sectional dimension divided by the pulverization threshold (DR=LCD/PT). Then, a primary ratio (PR) is defined as the dimension ratio divided by the sphericity (PR=DR/S). In some examples, the primary ratio (PR) is less than 0.9 or, more specifically, less than 0.8 or even less than 0.7. In more specific examples, the primary ratio (PR) is selected based on an expected depth of charge of the high-capacity material and/or on the composition of the electrochemically active-material structures.

Referring to FIG. 2B, electrochemically active-material structures 110 are predominantly disjoined structures. The disjoined structures are defined as any two structures in which the high-capacity material of one structure does not physically contact the high-capacity material of the other structure or at least minor contact prevents any direct lithium migration between the two structures as, e.g., is schematically shown in FIGS. 4A-4D. It should be noted that other components of these disjoined structures (e.g., SEI layers) can contact each other and even overlap. For example, a disjoint ratio of electrochemically active-material structures 110 is at least 70%, at least 80%, or even at least 90%. The "disjoint ratio" is defined as a ratio of the number of all disjoint structures to the number of all (disjoint and fused) structures in a negative battery electrode. This disjoined aspect together with the distribution aspect help to keep electrochemically active-material structures 110 separate and, therefore, below the pulverization threshold (PT) and/or above the sphericity (S) level described above.

In some examples, electrochemically active-material structures 110 are uniformly distributed within negative battery electrode 100 or, more specifically, within negative active material layer 102. The uniform distribution is defined as the difference in the volume, occupied by the electrochemically active-material structures in two disjoined unit volumes being less than 20%. The uniform distribution helps to prevent lithium welding/joining of electrochemically active-material structures 110 during cycling of the lithium-ion electrochemical cell that this negative battery electrode 100 is a part of.

In some examples, electrochemically active-material structures 110 form, at least in part, negative active material layer 102 as, e.g., is shown in FIG. 2A. Negative active material layer 102 has a specific porosity defined as a ratio of a volume of all void spaces in the negative active material to a volume of the electrochemically active-material structures (SP=$V_{VOIDS}/V_{EAMS}$). The specific porosity (SP) should be distinguished from conventional porosity, where the basis would be the total volume of negative active material layer 102. In some examples, the specific porosity (SP) of the negative active material layer is at least 200% or, more specifically at least 300% or even at least 500%. The specific porosity (SP) provides a direct reference as to how much space is available in negative active material layer 102 for electrochemically active-material structures 110 to swell into. The sufficient amount of space prevents electrochemically active-material structures 110 from pushing on each other and potentially causing these particles to join together/fuse (and potentially exceeding the pulverization threshold).

In some examples, negative battery electrode 100 further comprises additional structures 120 that are configured to experience substantially no volume change during the cycling of the lithium-ion electrochemical cell. More specifically, the relative positions of electrochemically active-material structures 110 and additional structures 120 remain the same during the cycling of the lithium-ion electrochemical cell. An experiment (described below with reference to FIG. 6A) illustrates this phenomenon for silicon and graphite structures where the graphite structures operate as a matrix for supporting the silicon structures.

Some examples of additional structures 120 include, but are not limited to, conductive-additive structures 122, stabilizing structures 124, and binder 126. For example, conductive-additive structures 122 can be formed from a material selected from the group consisting of graphite, acetylene black, metal silicides, metal oxides, and silicates. In more specific examples, additional structures 120 contribute at least 20% of the total lithiation capacity of negative battery electrode 100 or, more specifically, at least 40%, at least 60%, or even at least 80%.

Some examples of binder 126 include, but are not limited to, arboxymethyl cellulose (CMC), styrene-butadiene rubber (SBR), polyacrylic acid (PAA), polyimides (PI), and poly(3,4-ethylenedioxythiophene) polystyrene sulfonate (PEDOT:PSS). The concentration of polymer binder 126 in negative active layer 102 may be less than 20% by weight or even less than 1% by weight.

In some examples, additional structures 120 comprise graphite. Other suitable materials include, but are not limited to, oxides such as lithium titanate ($Li_4Ti_5O_{12}$—150 mAh/g lithiation capacity) and $Li_3V_2O_5$ (250 mAh/g). All of the materials experience little if any swelling during lithiation. Electrochemically active-material structures 110 comprise silicon. The weight ratio of additional structures 120 to electrochemically active-material structures 110 is one of (a) less than 5, (c) greater than 1, (d) greater than 10, or (e) greater than 90.

Conductive-additive structures 122 can be used to provide electronic conductivity among electrochemically active-material structures 110. For example, electrochemically active-material structures 110 can be formed from materials having low electronic conductivity, such as silicon (which has a conductivity of between $10^{-2}$ to $10 \Omega^{-1}\text{-cm}^{-1}$). Conductive-additive structures 122 can be formed from electronically conductive materials. In some examples, conductive-additive structures 122 comprise one or more carbon, silicide, metal, and a metal alloy. The addition of conductive-additive structures 122 makes the entire structure more stable and ensures electronic connections to electrochemically active-material structures 110, e.g., when electrochemically active-material structures 110 become separated from each other and may not have direct contact/electronic path. For example, 1-D carbon structures (e.g., carbon nanotubes, carbon fibers, carbon nanowires) and 2-D carbon structures (e.g., graphene, conductive graphite) have a wrapping effect, when used as conductive-additive structures 122. In other words, such conductive-additive structures 122 wrap around electrochemically active-material structures 110 have a much lower chance to lose the electrical connection to other electrode components.

In some examples, conductive-additive structures 122 have a shape of 0-D structures (e.g., particles), 1-D structures (e.g., wires, rods), 2-D structures (e.g., flakes, plates), or 3-D networks. For example, 0-D structures have a small size, e.g., 10 nanometers to 100 nanometers, such as Super P. Such structures are very efficient in filling void spaces to ensure better conductivity. 1-D structures can ensure the mechanically integrating and connection of electrochemically active-material structures 110. 2-D structures or 3-D structures can provide wrapping and integrate electrochemically active-material structures 110, forming a conductive network and mechanical network.

In some examples, electrochemically active-material structures 110 (e.g., adhesive entities) are physically or chemically attached to an exterior of at least some of electrochemically active-material structures 110. For example, conductive-additive structures 122 can be attached to electrochemically active-material structures 110 using adhesive entities, bound to both conductive-additive structures 122 and electrochemically active-material structures 110. For example, each of conductive-additive structures 122 comprises both hydrophilic functional groups and hydrophobic functional groups. In some examples, conductive-additive structures 122 comprises one or more sodium dodecyl sulfate, sodium stearate, octaethylene glycol monododecyl ether, abietic acid, benzalkonium chloride, cetrimonium bromide, cetrimonium chloride, cetrimonium hexafluorophosphate, aluminum isopropoxide, decyltrimethoxysilane, Perfluorooctanesulfonic acid, lignosulfonates, titanium triisostearoylisopropoxide, Isopropoxyaluminum distearate, octylphenoxypolyethoxyethanol, or 2-[4-2,4,4-trimethylpentan-2-ylphenoxy]ethanol.

Figure 5:
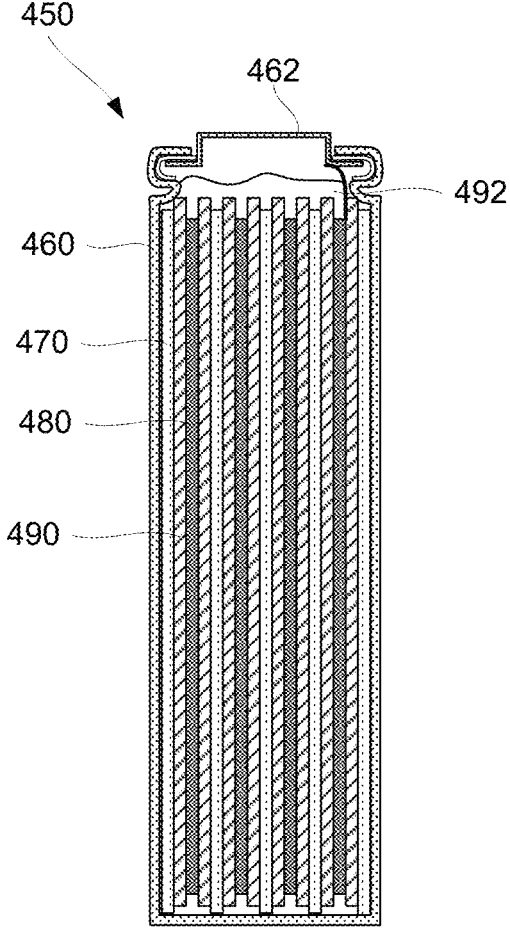
FIG. 5 is a schematic cross-sectional view of a battery cell fabricated using the negative electrode of FIG. 2A, in accordance with some examples.

Examples of Electrochemical Cells Fabricated with Electrochemically Active-Material Structures FIG. 5 is a schematic illustration of electrochemical cell 450, comprising first electrode 470, second electrode 480, and separator 490 arranged in a stack, wound jelly-roll, or any form. One of these electrodes can be negative battery electrode 100 and comprise electrochemically active-material structures 110 described above. Separator 490 is disposed between first electrode 470 and second electrode 480 to prevent direct contact between first electrode 470 and second electrode 480 yet allows ionic communication between these electrodes. Specifically, separator 490 may include pores allowing ions to pass.

Electrochemical cell 450 also includes electrolyte 492, which operates as a carrier of ions during the cycling of electrochemical cell 450. First electrode 470, second electrode 480, and other components of the cell may be enclosed and separated from the environment by case 460 and lid 462. In some examples, case 460 and/or lid 462 may operate as terminals of electrochemical cell 450, in which case current collectors of first electrode 470 and/or second electrode 480 may be connected to case 460 and/or lid 462. Some examples of such electrochemical cells include, but are not limited to, lithium-ion batteries, lithium polymer batteries, lithium-air batteries, lithium sulfite batteries, lithium metal batteries, solid-state batteries, supercapacitors, and the like.

In some examples, case 460 is rigid (e.g., the case is a steel can). Other types of cells may be packed into a flexible, foil-type (e.g., polymer laminate) case. The case material selection depends on polarity of case 460 (e.g., neutral, connected to positive electrodes, connected to negative electrodes) as well as the composition of electrolyte, operating potentials of electrochemical cell 450, and other like factors. For example, when case 460 is connected to a positive electrode, case 460 may be formed from titanium, titanium alloys, aluminum, aluminum alloys, and/or stainless steel. On the other hand, if case 460 is connected to a negative electrode, then case 460 may be made from titanium, titanium alloys, copper, nickel, lead, and stainless steels. The electrical connection between case 460 and an electrode may be established by a direct contact between case 460 and this electrode (e.g., an outer wound of the jelly roll), by a tab connected to the electrode and case 460, and other techniques.

The top of case 460 may be open and used for insertion of the electrode assembly (e.g., a jelly roll) and then capped with a header assembly, which may include a weld plate, a rupture membrane, a PTC-based resettable fuse, and an insulating gasket. The insulating gasket is used to support the conductive components of the header assembly and to insulate these components from case 460. In some examples, a PTC-based resettable fuse is disposed between edges of the rupture membrane and edges of the header cup, effectively interconnecting these two components. At normal operating temperatures, the resistance of PTC-based resettable fuse is low. However, its resistance increases substantially when heated. For example, the PTC-based resettable fuse may be a thermally activated circuit breaker that can electrically disconnect the rupture membrane from the header cup.

Types of electrochemical cells are determined by active materials used on positive and negative electrodes as well as composition of electrolyte. Some examples of positive active materials include $Li(M'_xM''_Y)O_2$, where M' and M'' are different metals (e.g., $Li(Ni_XMn_Y)O_2$, $Li(Ni_{1/2}Mn_{1/2})O_2$, $Li(Cr_XMn_{1-X})O_2$, $Li(Al_XMn_{1-X})O_2$), $Li(Co_XM_{1-X})O_2$, where M is a metal, (e.g., $Li(Co_XNi_{1-X})O_2$ and $Li(Co_XFe_{1-X})O_2$), $Li_{1-W}(Mn_XNi_YCo_Z)O_2$, (e.g., $Li(Co_XMn_YNi_{(1-X-Y)})O_2$, $Li(Mn_{1/3}Ni_{1/3}Co_{1/3})O_2$, $Li(Mn_{1/3}Ni_{1/3}Co_{1/3-X}Mg_X)O_2$, $Li(Mn_{0.4}Ni_{0.4}Co_{0.2})O_2$, $Li(Mn_{0.1}Ni_{0.1}Co_{0.8})O_2$,) $Li_{1-W}(Mn_XNi_XCO_{1-2X})O_2$, $Li_{1-W}(Mn_XNi_YCoAl_W)O_2$, $Li_{1-W}(Ni_XCo_YAl_Z)O_2$ (e.g., $Li(Ni_{0.8}Co_{0.15}Al_{0.05})O_2$), $Li_{1-W}(Ni_XCo_YM_Z)O_2$, where M is a metal, $Li_{1-W}(Ni_XMn_YM_Z)O_2$, where M is a metal, $Li(Ni_{X-Y}Mn_YCr_{2-X})O_4$, $LiM'M''_2O_4$, where M' and M'' are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $LiNiCuO_4$, $LiMn_{1-X}Al_XO_4$, $LiNi_{0.5}Ti_{0.5}O_4$, $Li_{1.05}Al_{0.1}Mn_{1.85}O_{4-z}F_Z$, $Li_2MnO_3$) $Li_XV_YO_Z$, e.g., $LiV_3O_8$, $LiV_2O_5$, and $LiV_6O_{13}$.

Active materials may be deposited in active material layers and supported on conductive substrates. The conductive substrates not only provide mechanical support to the active material layers but also deliver electrical currents between the active material layers and battery terminals. Substrate materials may include copper, stainless steel, titanium, aluminum, nickel, chromium, tungsten, metal nitrides, metal carbides, carbon, carbon fiber, graphite, graphene, or combinations of the above including multi-layer structures. Various considerations described above with reference to case materials also apply to substrate materials. In some examples, the substrate is a foil, film, mesh, laminate, or any other suitable configuration.

In some embodiments, a separator is disposed between a positive electrode and an adjacent negative electrode. Some examples of separator material include poly(ethylene-co-tetrafluoroethylene (PETFE), poly(ethylenechloro-co-triffuoroethylene), polystyrenes, polyvinyl chlorides polypropylene, polyethylene, polyamides, polyimides, polyacrylics, polyacetals, polycarbonates, polyesters, polyetherimides, polyimides, polyketones, polyphenylene ethers, polyphenylene sulfides, glass fiber materials, ceramics, and a polypropylene membrane.

The electrolyte provides ionic communication between positive and negative electrodes in the cell. The electrolyte may be liquid, solid, or gel. A liquid electrolyte may include one or more solvents and one or more lithium-containing salts. Some solvent examples include cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), and amides (e.g., dimethyl formamide). Some examples of salts include $LiPF_6$, $LiBF_4$, $LiClO_4$ $LiAsF_6$, $LiN(CF_3SO_2)_2$, LiN $(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. The total concentration of one or more salts in the electrolyte is at least about 0.3 M or, more specifically, at least about 0.7M.

Experimental Results

Various tests were conducted to evaluate the performance of electrochemically active-material structures comprising a high-capacity material. The tests were conducted using full battery cells with positive electrodes comprising lithium nickel-manganese-cobalt oxide (NMC) positive active materials. The negative electrode was formed using silicon structures of different sizes.

Figure 6A:
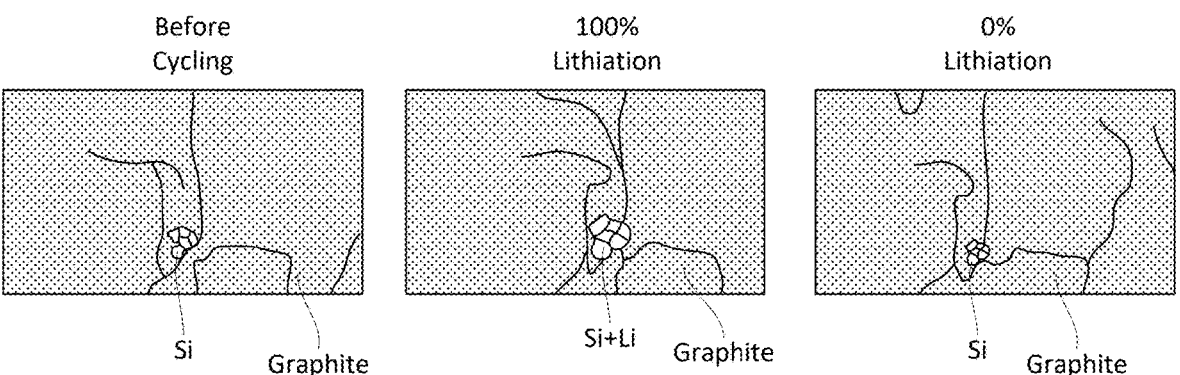
FIG. 6A is a schematic reproduction of a scanning electron microscope (SEM) image of graphite structures and silicon structures (having a mean largest cross-sectional dimension below the silicon pulverization threshold) in a negative electrode at various cycling stages.

FIG. 6A is a schematic reproduction of an SEM image of graphite structures and silicon structures (having a mean largest cross-sectional dimension below the silicon pulverization threshold) in a negative electrode at various cycling stages. Specifically, FIG. 6A illustrates that the position of the silicon structures remains the same during cycling. The silicon structures are not pushed away by each other due to their small size and relatively sparse distribution within the graphite structures that are operable as a matrix.

Figure 6B:
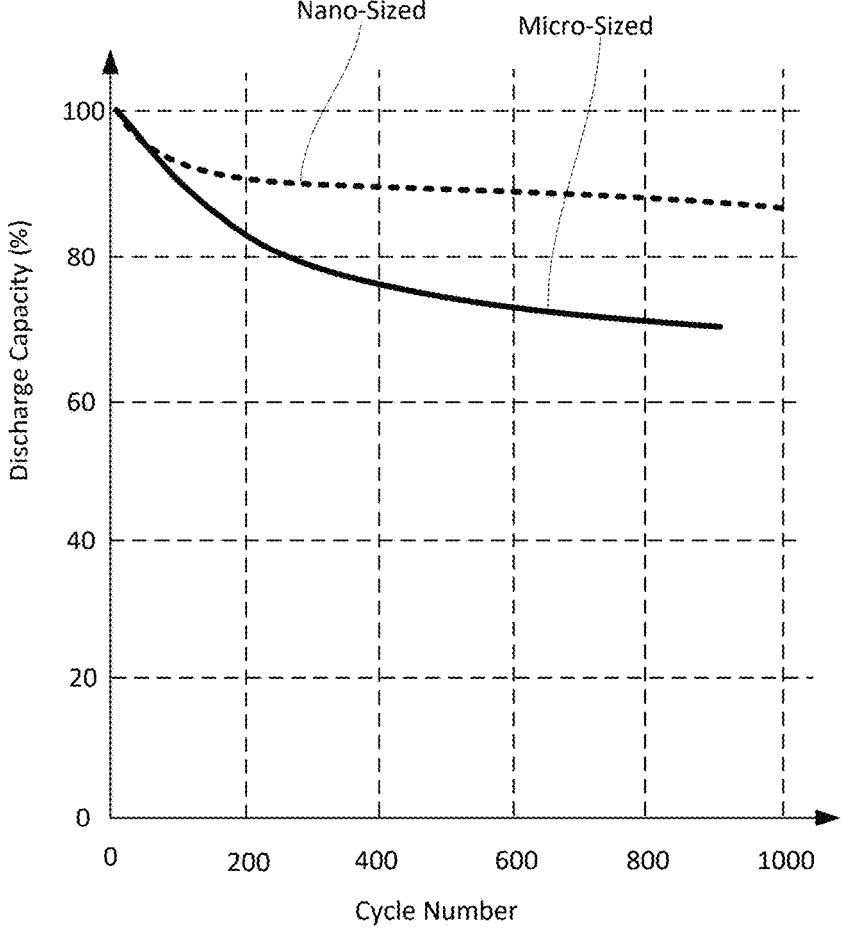
FIG. 6B is a discharge capacity plot as a function of the cycle number for nano-sized silicon particles (the mean largest cross-sectional dimension being below the silicon pulverization threshold) and micro-sized silicon particles (the mean largest cross-sectional dimension being above the silicon pulverization threshold).

FIG. 6B illustrates cycling profiles for silicon-based cells. The bottom solid line represents a cell formed with micro-sized silicon structures, while the top dotted line represents a cell formed with nano-sized silicon structures, showing substantial improvement in cycle life.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

What is claimed is:

1. A negative battery electrode for use in a lithium-ion electrochemical cell, the negative battery electrode comprising:

electrochemically active-material structures comprising a high-capacity material, wherein:

the electrochemically active-material structures have a mean largest cross-sectional dimension (LCD) below a pulverization threshold (PT) (LCD<PT), corresponding to composition of the electrochemically active-material structures, the electrochemically active-material structures have sphericity (S) of at least about 0.9, the high-capacity material is silicon, the high-capacity material represents at least 90% atomic of the electrochemically active-material structures, and the pulverization threshold is 1 micrometer.

2. The negative battery electrode of claim 1, wherein the electrochemically active-material structures have the sphericity of at least about 0.95.

3. The negative battery electrode of claim 1, wherein the mean largest cross-sectional dimension is within 50% of the pulverization threshold.

4. The negative battery electrode of claim 1, wherein:
the electrochemically active-material structures have a dimension ratio (DR) defined as the mean largest cross-sectional dimension divided by the pulverization threshold (DR=LCD/PT), and
a primary ratio (PR), defined as the dimension ratio divided by the sphericity (PR=DR/S), is less than 0.9.

5. The negative battery electrode of claim 4, wherein the primary ratio (PR), defined as the dimension ratio divided by the sphericity (PR=DR/S), is less than 0.8.

6. The negative battery electrode of claim 4, wherein the primary ratio (PR) is selected based on an expected depth of charge of the high-capacity material.

7. The negative battery electrode of claim 1, wherein the electrochemically active-material structures are predominantly disjoint structures with a disjoint ratio of at least 90%.

8. The negative battery electrode of claim 1, wherein the electrochemically active-material structures are uniformly distributed within the negative battery electrode.

9. The negative battery electrode of claim 1, further comprising additional structures that are configured to experience substantially no volume change during cycling of the lithium-ion electrochemical cell, wherein relative positions of the electrochemically active-material structures and the additional structures remain same during the cycling of the lithium-ion electrochemical cell.

10. The negative battery electrode of claim 9, wherein the additional structures are selected from the group consisting of conductive-additive structures, stabilizing structures, and binder.

11. The negative battery electrode of claim 10, wherein the additional structures are the conductive-additive structures formed from a material selected from the group consisting of graphite, acetylene black, metal silicides, metal oxides, and silicates.

12. The negative battery electrode of claim 9, wherein the additional structures comprise one or more of graphite and lithium titanate ($Li_4Ti_5O_{12}$).

13. The negative battery electrode of claim 12, wherein the additional structures contribute at least 20% of a total lithiation capacity of the negative battery electrode.

14. The negative battery electrode of claim 12, wherein:
the additional structures comprise graphite,
the electrochemically active-material structures comprise silicon, and
a weight ratio of the additional structures to the electrochemically active-material structures is one of (a) less than 5, (c) greater than 1, (d) greater than 10, or (e) greater than 90.

15. The negative battery electrode of claim 1, wherein:
the electrochemically active-material structures further comprise an additional material, besides the high-capacity material,
the additional material is selected from the group consisting of magnesium, lithium, calcium, aluminum, copper, nickel, and iron.

16. The negative battery electrode of claim 1, wherein:
the electrochemically active-material structures form, at least in part, a negative active material layer,
the negative active material layer has a specific porosity defined as a ratio of a volume of all void spaces in the negative active material layer to a volume of the electrochemically active-material structures ($SP=V_{VOIDS}/V_{EAMS}$), and
the specific porosity (SP) of the negative active material layer is at least 200%.

17. The negative battery electrode of claim 16, wherein the specific porosity (SP) of the negative active material layer is at least 300%.

18. A negative battery electrode for use in a lithium-ion electrochemical cell, the negative battery electrode comprising:
electrochemically active-material structures comprising a high-capacity material, wherein:
the electrochemically active-material structures have a mean largest cross-sectional dimension (LCD) below a pulverization threshold (PT) (LCD<PT), corresponding to composition of the electrochemically active-material structures,
the electrochemically active-material structures have sphericity (S) of at least about 0.9,
the high-capacity material is silicon,
the high-capacity material represents at least 30% atomic of the electrochemically active-material structures, and
the pulverization threshold is 20 micrometers.

19. Electrochemically active-material structures for use in a negative battery electrode of a lithium-ion electrochemical cell, the electrochemically active-material structures comprising:
a high-capacity material, wherein:
the electrochemically active-material structures have a mean largest cross-sectional dimension (LCD) below a pulverization threshold (PT) (LCD<PT), corresponding to composition of the electrochemically active-material structures,
the electrochemically active-material structures have sphericity (S) of at least about 0.9,
the high-capacity material is silicon,
the high-capacity material represents at least 90% atomic of the electrochemically active-material structures, and
the pulverization threshold is 1 micrometer.

\* \* \* \* \*